(12) United States Patent
Said (10) Patent No.: US 11,180,042 B2
(45) Date of Patent: Nov. 23, 2021

(54) CHARGING DEVICE FOR CHARGING A CHARGE STORAGE DEVICE

(71) Applicant: Bayerische Motoren Werke Aktiengesellschaft, Munich (DE)

(72) Inventor: Tarek Said, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 973 days.

(21) Appl. No.: 14/574,743

(22) Filed: Dec. 18, 2014

(65) Prior Publication Data

US 2015/0102776 A1 Apr. 16, 2015

Related U.S. Application Data

(63) Continuation of application No. PCT/EP2013/063553, filed on Jun. 27, 2013.

(30) Foreign Application Priority Data

Jun. 27, 2012 (DE) ..................... 10 2012 211 048.8

(51) Int. Cl.
*B60L 53/16* (2019.01)
*B60L 53/30* (2019.01)
*H05B 45/12* (2020.01)

(52) U.S. Cl.
CPC .............. *B60L 53/16* (2019.02); *B60L 53/30* (2019.02); *H05B 45/12* (2020.01); *B60L 2250/16* (2013.01); *Y02T 10/70* (2013.01); *Y02T 10/7072* (2013.01); *Y02T 90/14* (2013.01)

(58) Field of Classification Search
CPC .............................. B60L 11/1818; B60Q 3/20
USPC ........................................... 362/610; 320/109
See application file for complete search history.

(56) References Cited

U.S. PATENT DOCUMENTS 4,621,306 A * 11/1986 Sell ........................ B60K 37/02
362/23.01
4,760,502 A * 7/1988 Ackeret ................. G11B 23/02
206/308.1
4,776,661 A * 10/1988 Handa ................ G02B 6/12004
385/130

(Continued)

FOREIGN PATENT DOCUMENTS

CN 1481059 A 3/2004
DE 195 25 843 C1 7/1996
(Continued)

OTHER PUBLICATIONS

Chinese Office Action issued in counterpart Chinese Application No. 201380020220.4 dated Dec. 25, 2015 with English translation (20 pages).

(Continued)

*Primary Examiner* — David V Henze-Gongola
*Assistant Examiner* — Tarikh Kanem Rankine
(74) *Attorney, Agent, or Firm* — Crowell & Moring LLP (57) ABSTRACT

A charging device for charging a charge storage device includes a coupling device for coupling a connector for charging the charge storage device, an optical waveguide for illuminating the coupling device and/or for indicating a state of charge of the charge storage device, and a light source for coupling light into the optical waveguide. Search lighting and an indication of the state of charge of the charge storage device can be realized by way of the optical waveguide.

20 Claims, 3 Drawing Sheets

(56) References Cited

U.S. PATENT DOCUMENTS

| | | | | |
|---|---|---|---|---|
| 5,005,108 | A * | 4/1991 | Pristash | G02B 6/0005 362/23.15 |
| 5,009,483 | A * | 4/1991 | Rockwell, III | G02B 6/0033 348/804 |
| 5,059,746 | A * | 10/1991 | Hayes | H05K 5/0091 174/524 |
| 5,757,595 | A * | 5/1998 | Ozawa | B60L 11/1818 320/104 |
| 7,334,913 | B1 * | 2/2008 | Chen | A47G 33/0809 362/186 |
| 7,722,237 | B2 * | 5/2010 | Watson | G09F 13/04 362/154 |
| 2001/0003413 | A1 | 6/2001 | Kajiura | |
| 2002/0073623 | A1 * | 6/2002 | Sakamoto | B60J 5/0479 49/366 |
| 2008/0037275 | A1 * | 2/2008 | Eblenkamp | D06F 39/00 362/610 |
| 2009/0021364 | A1 | 1/2009 | Frey et al. | |
| 2009/0174365 | A1 | 7/2009 | Lowenthal et al. | |
| 2010/0045450 | A1 * | 2/2010 | Suzuki | B60K 1/04 340/438 |
| 2010/0246198 | A1 * | 9/2010 | Hook | B60L 11/1818 362/459 |
| 2011/0043355 | A1 * | 2/2011 | Chander | B60L 11/1818 340/455 |
| 2011/0277361 | A1 * | 11/2011 | Nichol | G02B 6/0018 40/541 |
| 2012/0083148 | A1 * | 4/2012 | Hirashita | B60L 11/1818 439/304 |

FOREIGN PATENT DOCUMENTS

| | | |
|---|---|---|
| DE | 100 26 256 A1 | 12/2001 |
| DE | 10 2007 015 037 B3 | 6/2008 |
| DE | 10 2010 008 334 A1 | 8/2011 |
| DE | 10 2010 008 343 A1 | 8/2011 |
| EP | 1 351 340 A1 | 10/2003 |
| FR | 2 962 695 A1 | 1/2012 |
| GB | 2468560 A | 9/2010 |
| JP | 2001-169467 A | 6/2001 |
| JP | 2012-64504 A | 3/2012 |
| WO | WO 2009/002616 A1 | 12/2008 |

OTHER PUBLICATIONS

International Search Report dated Jan. 29, 2014, with English translation (Ten (10) pages).

German Search Report dated Feb. 4, 2013, with partial English translation (Nine (9) pages).

Cars.com: "Charging the 2010 Tesla Roadster", Oct. 13, 2010 (Oct. 13, 2010), XP054975292, Retrieved from the Internet: URL:http://www.youtube.com/watch?v=KnNqMTKPfLA [retrieved on Jan. 16, 2014].

* cited by examiner

CHARGING DEVICE FOR CHARGING A CHARGE STORAGE DEVICE

CROSS REFERENCE TO RELATED APPLICATIONS

This application is a continuation of PCT International Application No. PCT/EP2013/063553, filed Jun. 27, 2013, which claims priority under 35 U.S.C. § 119 from German Patent Application No. 10 2012 211 048.8, filed Jun. 27, 2012, the entire disclosures of which are herein expressly incorporated by reference.

BACKGROUND AND SUMMARY OF THE INVENTION

The invention relates to a charging device for charging a charge storage device, in particular a charging socket, and to a control device for controlling illumination of the charging device. The invention further relates to the system for charging a charge storage device and to a vehicle provided with such a system.

Electric mobility is becoming increasingly important in the automotive sector. An electric vehicle has a charge storage device which, for charging, is connected to a supply voltage via a connector. For connecting the connector to the charge storage device, the vehicle has a charging device with a coupling device for coupling the connector. The charging device can be designed as a charging socket that is hidden underneath a cover. The coupling device for coupling the connector is located in the charging socket. The coupling device can be designed as a plug socket into which the charging connector is plugged for charging the charge storage device.

In contrast to refueling a vehicle having a combustion engine, which usually takes place at an illuminated gas station, charging the charge storage device of an electric vehicle generally takes place in one's own garage in which the lighting conditions are often insufficient. After folding back the cover of the charging device, the coupling device and, in particular, the geometric shape of the plug socket into which the charging connector has to be plugged is often hardly visible. In contrast to refueling the vehicle, the charging process of the vehicle cannot be read from a meter or indicated through an acoustic signal.

It is desirable to provide a charging device for charging a charge storage device, wherein the inside of the charging device is sufficiently illuminated and wherein the state of charge is indicated during the charging process. Moreover, a control device for controlling illumination of the charging device is to be provided. Furthermore, a system for charging a charge storage device is provided.

An embodiment of the charging device for charging a charge storage device comprises a coupling device for coupling a connector for charging the charge storage device, an optical waveguide for illuminating the coupling device and/or for indicating a state of charge of the charge storage device, and a light source for coupling light into the optical waveguide.

The charging device can be designed as a charging socket that is arranged underneath a cover element or a charging flap for covering the coupling device. The charging socket comprises a charging pot, a faceplate in which the coupling device is arranged, the optical waveguide and the light source which can be configured, for example, as a light-emitting diode (LED). The optical waveguide, for example, can be fed in a C-shaped manner around the outer edge of the faceplate. The optical waveguide may end in the region of the hinge of the cover element. The optical waveguide functions both as search lighting and as a control lamp for the respective indication of the state of charge of the charge storage device. It radiates as an indirect light source from the lateral edge into the charging pot. The optical waveguide can be arranged at the edge of the charging pot in such a manner that the light exiting the optical waveguide does not radiate directly into the road space. Preferably, the optical waveguide is arranged in the charging device in such a manner that there is no visibility of the optical waveguide from the rear view of a vehicle at an angle of 15°.

At one end, but preferably at both ends, of the optical waveguide, in-coupling points for coupling light into the optical waveguide can be provided. At an in-coupling point, a light source designed as a light-emitting diode can be arranged. The LEDs at the in-coupling points can be RGB LEDs, by means of which the complete color space can be represented.

The function of the optical waveguide as search lighting or as a control/indicator lamp for the status of the charging process or the status of charge of the charge storage device can be controlled by a control device. An embodiment of a control device for controlling illumination of the charge device for charging the charge storage device is specified such that the control device is designed for detecting whether the charging device is operated in a first state, in which the cover element is open and the connector is not connected to the coupling device, or is operated in a second state, in which the cover element is open and the connector for charging the charge storage device is connected to the coupling device. The control device actuates the light source of the charging device in such a manner that the light source changes the light to be coupled into the optical waveguide of the charging device depending on whether the charging device is operated in the first or the second state. In a vehicle, the control device can comprise the charge interface module, for example.

A Hall sensor can be integrated in the charging device. By means of the Hall sensor, the control device can detect if the charging flap is open. When the control device has detected that the charging flap is open, it actuates the light source in such a manner that the inside of the charging socket is illuminated, for example, by white homogenous light as search lighting. When attaching the charging connector, the search lighting is turned off and the transition of the optical waveguide into the (colored) indicator/control mode takes place. During a validation phase, in which the control device checks correct coupling of the charging connector to the coupling device, the vehicle owner receives a supporting feedback message for correct attachment of the charging connector. A colored indication of the validation process preferably precedes the indication of the respective status of charge.

If no charging connector is attached, the homogenous, for example, white light of the optical waveguide goes out after two minutes, for example. The search lighting preferably also goes out in the state "Ready to start" of the electric vehicle, or, it is not activated in the first place if it has already been in the deactivated state. After the state of charge is indicated by means of the optical waveguide, after attaching the charging connector, and the light source is active, the light goes out after a predetermined time, for example after three minutes, since during this time, the bus goes into idle mode and the vehicle "falls asleep". When the vehicle owner unlocks his vehicle, for example, after a completed charging process, the state of charge indicator is activated again by the control device and indicates the current state of charge in corresponding color and light dynamic. After a predetermined time, for example after three minutes, this state too is terminated again.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
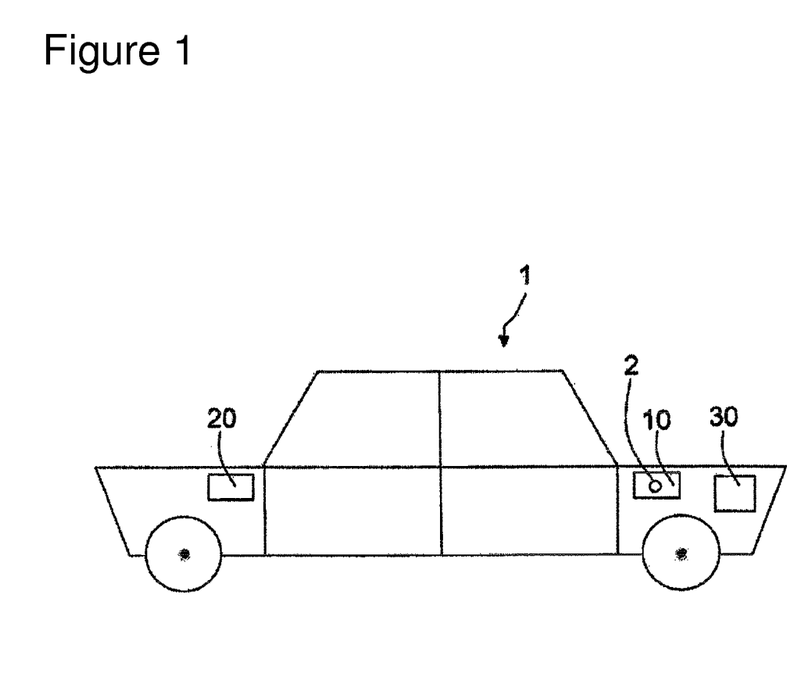
FIG. 1 is a highly schematic diagram of a vehicle with a system for charging a charge storage device of the vehicle.

FIG. 1 shows a vehicle 1 with a system for charging an electrical charge storage device 30 of the vehicle. The system includes a charging device 10 and a control device 20 for controlling a charging process of the charge storage device 30 of the vehicle. For charging the charge storage device 30, a charging connector 2 is connected to the charging device 10.

Figure 2A:
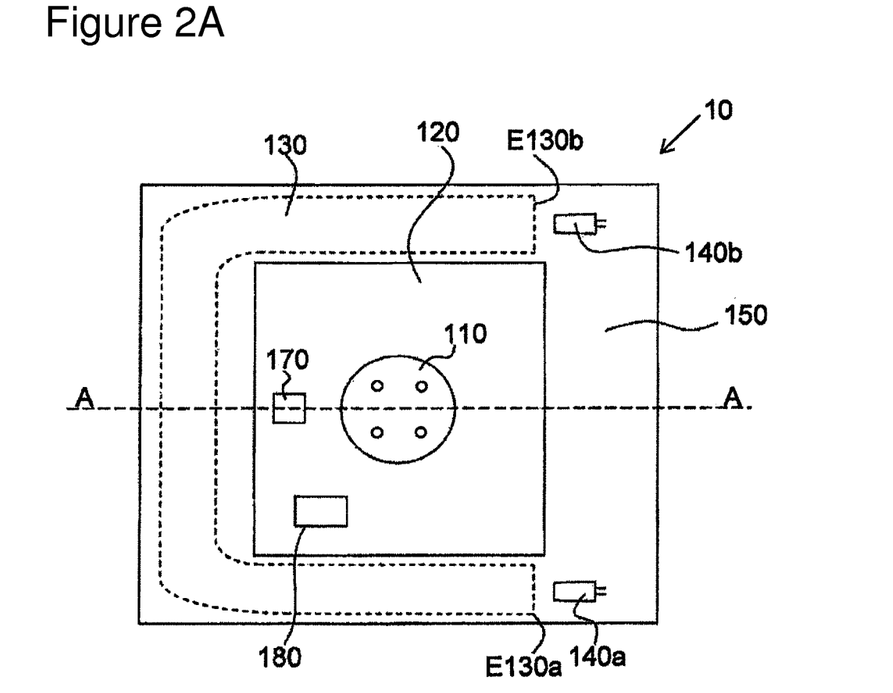
FIG. 2A is a schematic diagram of an embodiment of a charging device for charging a charge storage device in a top view.
Figure 2B:
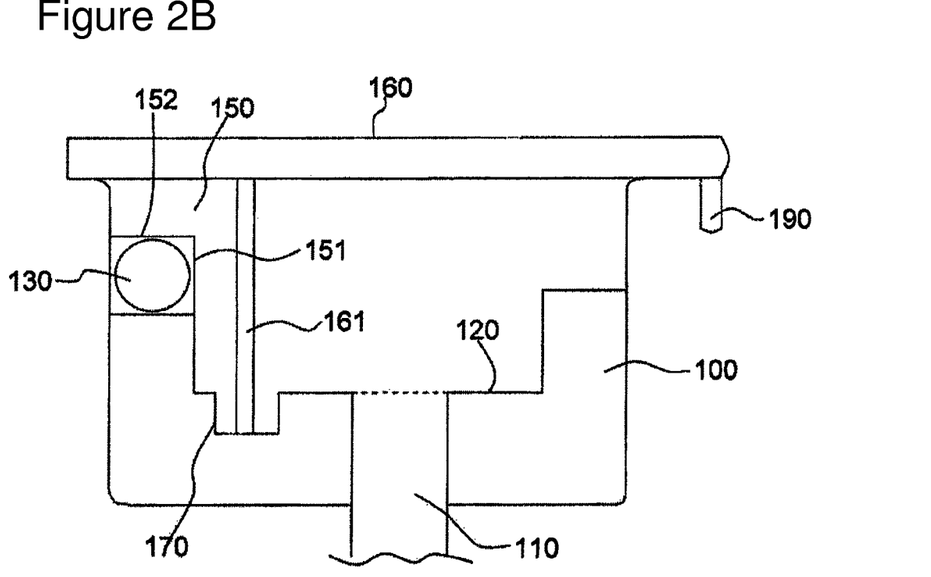
FIG. 2B is a schematic diagram of an embodiment of a charging for charging a charge storage device in a cross-section view.

FIG. 2A is a sectional view of an embodiment of a charging device 10 designed as a charging socket. The charging device is illustrated in FIG. 2B in a cross-section view taken along the section line A-A of FIG. 2A. The charging device 10 can be designed as a charging socket that has a base body 100 that is pot-shaped to form a charging pot. The charging device includes a coupling device 110 for coupling the connector 2 to the charging device for the charging process. The coupling device 110 can be arranged on the inner side of the charging pot of the charging socket. The coupling device 110 can be designed as a country-specific connector variant, for example as a plug socket. The charging device 10 further includes a faceplate 120 in which the coupling device 110 is arranged. By means of different faceplates, different connector variants 110 can be integrated in the charging socket without the need to change the design of the charging socket.

Furthermore, the charging device 10 includes an optical waveguide 130 for illuminating the coupling device and/or for indicating a state of charge of the charge storage device 30. The optical waveguide 130 can be arranged in a C-shaped or ring-shaped manner around the outer edge of the faceplate 120. In the exemplary embodiment of FIG. 2A, the optical waveguide is fed around all sides, except for one side, of the charging device 10 along the edge of the faceplate 120. The optical waveguide ends at that side of the charging socket at which a cover element (lid) 160 for closing the charging socket having a hinge 190 is arranged. At one end or at both ends E130a, E130b, as shown in the embodiment of FIG. 2A, the optical waveguide can have an in-coupling point for coupling light into the optical waveguide. For coupling light into the optical waveguide 110, light sources 140a, 140b can be arranged at the two ends. The light sources can be designed as light-emitting diodes (LEDs), for example. In order to be able to represent the complete color space, RGB LEDs are preferably used.

The optical waveguide 110 can be covered by a facing element 150. The facing element can be transparent at its lateral edge 151 in the direction towards the coupling device 110 and can be opaque on an upper side 152 in the direction towards the cover element 160 for closing the charging socket. When the light sources 140a, 140b couple light into the optical waveguide at the coupling points E130a, E130b, the optical waveguide as an indirect light source thus radiates light in a C-shaped manner from the lateral edge of the facing element into the charging pot 100 or in the direction of the coupling device 110.

The charging pot of the charging socket can be closed by means of the cover element 160. In an open state, the coupling device 110 is not covered by the cover element 160, whereas in a closed state of the cover element, the coupling device is covered by the cover element. Furthermore, the charging device can include a detector device 170 for detecting the open or closed state of the cover element 160. The detector device 170 can be configured as a Hall sensor. By a pin 161 of the cover element, illustrated in FIG. 2B, that engages into a locking device, a magnetic field changes during opening or closing of the cover element. The Hall sensor can be arranged in the locking device. The change in the magnetic field can be detected by the Hall sensor 170 so as to identify the open or closed state of the cover element. The light source 140a, 140b is designed to change the light coupled into the optical waveguide 130, depending on the detected open or closed state of the cover element 160.

Furthermore, the charging device can include a brightness sensor 180 for detecting brightness of the surroundings of the coupling device 110, which brightness sensor is arranged in the faceplate 120. The light source 140a, 140b is designed to change the light coupled into the optical waveguide 130, depending on the brightness detected by the brightness sensor 180.

Figure 3:
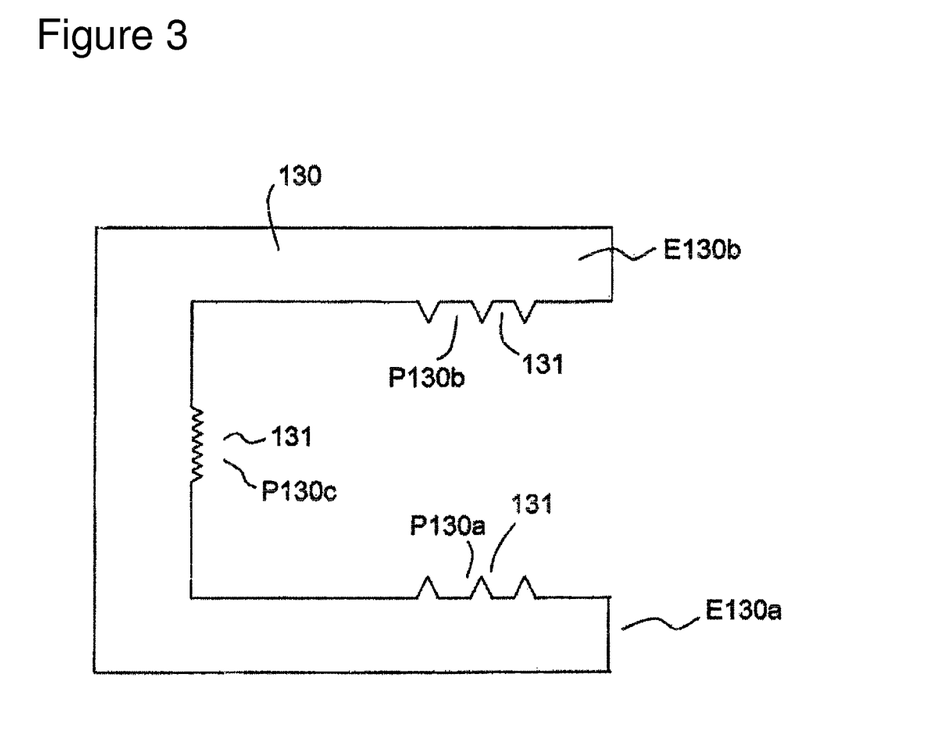
FIG. 3 is a schematic diagram of an embodiment of an optical waveguide of a charging device for charging a charge storage device.

FIG. 3 shows an embodiment of the optical waveguide 130, wherein an out-coupling structure 131 for out-coupling light from the optical waveguide is provided along the optical waveguide 130. The shape of the out-coupling structure can be different at different positions P130a, P130b and P130c of the optical waveguide. For example, the out-coupling structure 131 can vary along the optical waveguide 130 in such a manner that at the positions P130a, P130b in the region of the in-coupling positions E130a, E130b, less light is coupled out than at the more remote position P130c. This ensures that the optical waveguide emits light almost homogenously into the charging pot and thus in the direction towards the coupling device.

Figure 4:
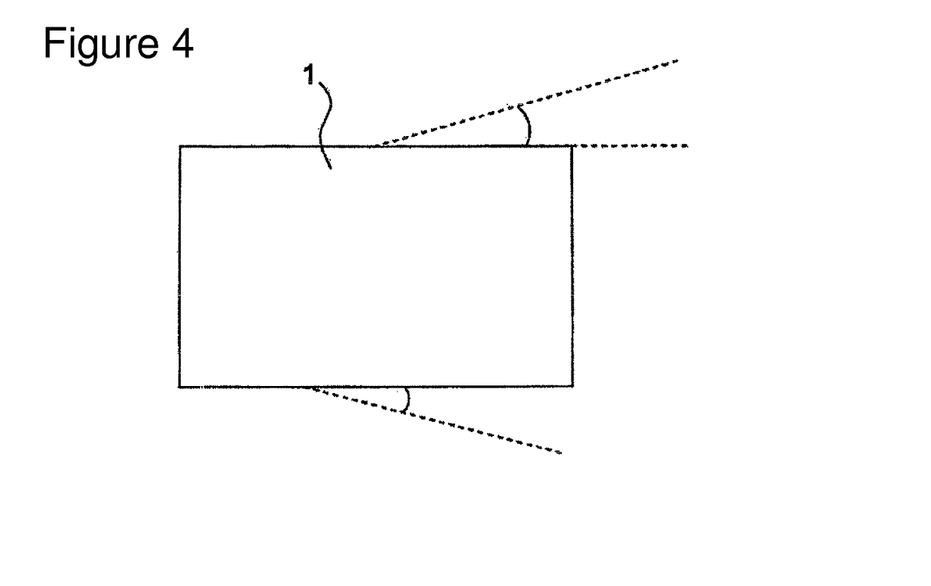
FIG. 4 is a schematic diagram illustrating the non-visibility from the rear side of a vehicle of the light generated by an optical waveguide of a charging device for charging a charge storage device.

The optical waveguide can be arranged in the charging device 10 in such a manner that the light emitted therefrom is not visible at a certain viewing angle viewed from the rear end of the vehicle. In the exemplary embodiment, the optical waveguide 130 and, in particular, the facing element 150, are configured such that in an angular range of 15° or less measured from the rear end of the vehicle, there is no visibility of the light exiting the optical waveguide along the course of the latter.

Hereafter, actuating the light source 140a, 140b for coupling light into the optical waveguide during preparation of the charging process is described. Actuating the light source is carried out by the control device 20, which includes a charge interface module, for example.

First, the control device 20 detects if the cover element 160 has been opened. Opening the cover element can be detected by means of the Hall sensor 170, for example. If it has been detected that the cover element is open, it is checked by the control device 20 if the vehicle is in the state "ready to start". In a vehicle driven by an electric motor, the state "ready to start" indicates that the electric motor is immediately ready to drive the vehicle. If the state "ready to start" has been detected, the light source 140*a*, 140*b* is not activated if it is already in the deactivated state. If the light source is already in an active light-emitting state, the control device deactivates the light source again so that the light emitted from the optical waveguide 130 goes out.

If the vehicle is not in the state "ready to start", the control device 20 checks whether the charging device 10 is in a first state or in a second state. In the first state of the charging device, the cover element 160 is open and the connector 2 is not yet connected to the coupling device 110. If this state is detected, the control device 20 activates the light source, for example the RGB LEDs 140*a*, 140*b*, in such a manner that the light source couples homogenous, for example, white light into the optical waveguide 130. The optical waveguide 130 thus radiates (white) light, which serves for search lighting for finding the coupling device 110 in the charging pot 100.

In the second state of the charging device 10, the cover element 160 is open and the connector 2 for charging the charge storage device 30 is connected to the coupling device 110. In this case, the control device 20 starts a validation process. In the validation process it is checked if the charging connector 2 is coupled to the coupling device as intended and if the requirements for the charging process are met. During the validation process, the control device 20 actuates the light source 140*a*, 140*b* in such a manner that the light source changes the emitted light compared to the search lighting. For example, the LEDs 140*a*, 140*b* are actuated such that they couple an orange-colored flashing light into the optical waveguide 130 during the validation phase.

If the control device 20 detects an error during the validation phase, the light generated by the light source is changed again. The control device 20 actuates the light-emitting diodes 140*a*, 140*b* in such a manner that, for example, the light diodes couple a red flashlight, for example three flashes in groups with a short time interval between the flashlight groups, into the optical waveguide 130.

If no error is detected during the validation phase for the charging process, the current state of charge of the charge storage device 30 is determined by the control device 20. The current state of charge is indicated visually by corresponding light signals that are coupled into the optical waveguide 130.

Now, the actual charging process can either begin or the vehicle is in a ready-to-charge state that is detected by the control device 20. When the charging process begins, the state of charge is monitored by the control device 20. When the vehicle is in the charging state, the control device 20 actuates the light source 140*a*, 140*b* such that the ready-to-charge state is indicated to the vehicle owner by corresponding light signals. For example, the control device 20 actuates the LEDs 140*a*, 140*b* such that the light source generates a light signal, the brightness of which increases slowly and decreases slowly again, and couples this light signal into the optical waveguide.

When the control device 20 detects that the charge storage device 30 is fully charged, it actuates the light source 140*a*, 140*b* with corresponding control signals so that the light source 140*a*, 140*b* generates a changed light signal and couples it into the optical waveguide 130. For example, the LEDs can couple continuous light into the optical waveguide which is coupled out again from the optical waveguide along the course of the latter. After a certain time, the control device 20 deactivates the light source 140*a*, 140*b* again.

In the ready-to-charge state, charging of the charge storage device 30 does not take place immediately but only at a later time. For example, the charging connector 2 is already connected during the day to the coupling device 110, whereas the actual charging process is carried out only at night.

When the vehicle is in the ready-to-charge state, the control device 20 actuates the light source 140*a*, 140*b* such that the ready-to-charge state is indicated to the vehicle owner by corresponding light signals. For example, the control device 20 actuates the LEDs 140*a*, 140*b* such that the light source generates a corresponding light signal and couples this light signal into the optical waveguide.

After the state of charge of the charge storage device has been indicated by emitting light along the optical waveguide, the control device 20 deactivates the light source again after some time, for example after three minutes, since the bus goes into the idle mode and the vehicle "falls asleep". During the time of charging, the light source 140*a*, 140*b* can be deactivated when the bus goes into idle mode, or by locking.

When, for example, a driver unlocks his vehicle after a completed charging process, the control device 20 activates the light source 20 so that light with a corresponding color and light dynamic exits again from the optical waveguide. The light signal exiting the optical waveguide indicates the current state of charge of the charge storage device. This state too can be terminated again after a predetermined time.

By using an optical waveguide 130 into which light is only coupled at one end (or at both ends) by, in each case, one light-emitting diode, costs of the system can be considerably reduced compared to the use of a large number of light-emitting diodes. By using an optical waveguide for generating the search lighting or for indicating the state of charge, moreover, the light-emitting surface is increased resulting in a better visibility of the light. Due to the preferably C-shaped configuration of the optical waveguide, the emitted light is visible from almost any viewing angle. Upon opening the charging flap, the search lighting function enables the coupling device to be easily found even at night. For better differentiability of the states during the charging process, the light color is also used for status coding in addition to the light dynamic. The light source 140*a*, 140*b*, for example, can generate light with different light colors, different brightnesses and/or different sequences of light pulses, and can couple the light into the optical waveguide 110. Through the appearance of light, the charging process can be staged.

REFERENCE LIST

1 Vehicle
2 Charging connector
10 Charging device
20 Control device
30 Charge storage device
10 Base body, charging socket, charging pot
110 Coupling device (connector)

120 Face plate
130 Optical waveguide
140 Light source (LED)
150 Facing element
151 Transparent side of the facing element
152 Opaque side of the facing element
160 Cover element
161 Pin of the cover element
170 Hall sensor
180 Brightness sensor
190 Hinge The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for charging a charge storage device, comprising:
   a base body having a pot-shaped structure that forms a charging pot;
   a coupling device for coupling a connector for charging the charge storage device, wherein the coupling device is arranged at a bottom surface of the charging pot, which bottom surface faces a cover element that covers the coupling device;
   an optical waveguide configured to illuminate the coupling device and to indicate a state of charge of the charge storage device, wherein the optical waveguide is arranged on an interior surface of the charging pot, which interior surface includes the bottom surface of the charging pot, the arrangement of the optical waveguide being such that the bottom surface of the charging pot is illuminated by the optical waveguide;
   a light source configured to couple light into the optical waveguide; and
   a facing element separate from the base body and configured to cover the optical waveguide, the facing element being transparent at a lateral side substantially perpendicular to the bottom surface and facing interior to the charging pot, the facing element also being opaque at an upper side facing outward from the charging pot, and wherein the optical waveguide has a first out-coupling structure arranged at a first position and the optical waveguide has a second out-coupling structure arranged at a second position, the first out-coupling structure having a grating that is spaced differently than a grating of the second out-coupling structure such that the optical waveguide emits less light at the first position than at the second position in order to ensure homogenous light emission towards the coupling device.

2. The charging device according to claim 1, wherein:
   the optical waveguide has an in-coupling point at least at one end for coupling light into the optical waveguide, and
   the light source is arranged at the at least one in-coupling point of the optical waveguide.

3. The charging device according to claim 1, wherein:
   the optical waveguide has a third out-coupling structure arranged at a third position that is opposed to the first position and the third out-coupling structure has a grating that is spaced differently than the grating of the second out-coupling structure such that the optical waveguide emits less light at the third position than at the second position.

4. The charging device according to claim 3, further comprising:
   a faceplate in which the coupling device is arranged, the optical waveguide extending along an edge of the faceplate.

5. The charging device according to claim 4, wherein the optical waveguide extends in a C-shaped or ring-shaped manner along the edge of the faceplate.

6. The charging device according to claim 4, further comprising:
   the cover element configured to cover the coupling device, wherein in an open state of the cover element, the coupling device is not covered by the cover element, and in a closed state of the cover element, the coupling device is covered by the cover element;
   a Hall sensor detector configured to detect the open state and the closed state of the cover element; and
   wherein the light source is designed to change light coupled into the optical waveguide depending on the open or closed state of the cover element detected by the Hall sensor detector.

7. The charging device according to claim 6, further comprising:
   a brightness sensor configured to detect a brightness of an environment of the coupling device; and
   wherein the light source is designed to change light coupled into the optical waveguide depending on the brightness detected by the brightness sensor.

8. The charging device according to claim 7, wherein the light source is designed to generate light having one or more of the following: (i) different colors, (ii) different brightnesses, and (iii) different sequences of light pulses, the light being coupled into the optical waveguide.

9. A control device for controlling illumination of a charging device for charging a charge storage device, the charging device comprising:
   a base body having a pot-shaped structure that forms a charging pot,
   a coupling device for coupling a connector used in charging the charge storage device, wherein the coupling device is arranged at a bottom surface of the charging pot, which bottom surface faces a cover element that covers the coupling device,
   an optical waveguide for illuminating the coupling device and indicating a charge state of the charge storage device, wherein the optical waveguide is arranged on an interior surface of the charging pot, which interior surface includes the bottom surface of the charging pot, the arrangement of the optical waveguide being such that the bottom surface portion of the charging pot is illuminated by the optical waveguide,
   a light source for coupling light into the optical waveguide, and
   a facing element separate from the base body and configured to cover the optical waveguide, the facing element being transparent at a lateral side substantially perpendicular to the bottom surface and facing interior to the charging pot, the facing element also being opaque at an upper side facing outward from the charging pot, and
   wherein the optical waveguide has a first out-coupling structure arranged at a first position and the optical waveguide has a second out-coupling structure arranged at a second position, the first out-coupling structure having a grating that is spaced differently than a grating of the second out-coupling structure such that the optical waveguide emits less light at the first position than at the second position in order to ensure homogenous light emission towards the coupling device, the control device comprising:
a controller programmed to:
detect whether the charging device is operating in a first state in which the cover element that covers the coupling device is open and the connector is not connected to the coupling device, or is operated in a second state in which the cover element is open and the connector is connected to the coupling device; and
actuate the light source such that light to be coupled into the optical waveguide of the charging device changes depending on whether the charging device is operated in the first state or the second state.

10. The control device according to claim 9, wherein the controller is further programmed to:
actuate the light source in the first state of the charging device such that the light source illuminates the coupling device of the charging device in the first state with homogeneous light;
detect, in the second state of the charging device, if the charging device is ready for charging the charge storage device or if an error status exists; and
actuate the light source such that the light to be coupled into the optical waveguide changes depending on whether the charging device is ready for charging or whether the error status exists.

11. The control device according to claim 10, wherein the controller is further programmed to:
detect at what point-in-time the charge storage device is to be charged; and
actuate the light source such that the light to be coupled into the optical waveguide changes depending on the point-in-time at which charging of the charge storage device takes place.

12. The control device according to claim 11, wherein the controller is further programmed to:
detect a state of charge of the charge storage device; and
actuate the light source such that the light to be coupled into the optical waveguide changes depending on the detected state of charge of the charge storage device.

13. A system for charging a charge storage device comprising:
a charging device for charging the charge storage device, the charging device comprising:
a base body having a pot-shaped structure that forms a charging pot;
a coupling device for coupling a connector for charging the charge storage device, wherein the coupling device is arranged at a bottom surface of the charging pot, which bottom surface faces a cover element that covers the coupling device;
an optical waveguide configured to illuminate the coupling device and to indicate a state of charge of the charge storage device, wherein the optical waveguide is arranged on interior surface of the charging pot, which interior surface includes the bottom surface of the charging pot, the arrangement of the optical waveguide being such that the bottom surface of the charging pot is illuminated by the optical waveguide;
a light source configured to couple light into the optical waveguide; and
a facing element separate from the base body and configured to cover the optical waveguide, the facing element being transparent at a lateral side substantially perpendicular to the bottom surface and facing interior to the charging pot, the facing element also being opaque at an upper side facing outward from the charging pot, and
wherein the optical waveguide has a first out-coupling structure arranged at a first position and the optical waveguide has a second out-coupling structure arranged at a second position, the first out-coupling structure having a grating that is spaced differently than a grating of the second out-coupling structure such that the optical waveguide emits less light at the first position than at the second position in order to ensure homogenous light emission towards the coupling device; and
a control device for controlling the illumination of the charging device for charging the charge storage device, the control device comprising a controller programmed to:
detect whether the charging device is operating in a first state in which the cover element that covers the coupling device is open and the connector is not connected to the coupling device, or is operated in a second state in which the cover element is open and the connector is connected to the coupling device; and
actuate the light source such that light to be coupled into the optical waveguide of the charging device changes depending on whether the charging device is operated in the first state or the second state.

14. The system according to claim 13, wherein the controller is further programmed to:
actuate the light source in the first state of the charging device such that the light source illuminates the coupling device of the charging device in the first state with homogeneous light;
detect, in the second state of the charging device, if the charging device is ready for charging the charge storage device or if an error status exists; and
actuate the light source such that the light to be coupled into the optical waveguide changes depending on whether the charging device is ready for charging or whether the error status exists.

15. The system according to claim 13, wherein the controller is further programmed to:
detect at what point-in-time the charge storage device is to be charged; and
actuate the light source such that the light to be coupled into the optical waveguide changes depending on the point-in-time at which charging of the charge storage device takes place.

16. The system according to claim 13, wherein the controller is further programmed to:
detect a state of charge of the charge storage device; and
actuate the light source such that the light to be coupled into the optical waveguide changes depending on the detected state of charge of the charge storage device.

17. A vehicle, comprising:
a charge storage device;
a charging device for charging the charge storage device, the charging device comprising:
a base body having a pot-shaped structure that forms a charging pot;
a coupling device for coupling a connector for charging the charge storage device, wherein the coupling device is arranged at a bottom surface of the charging pot, which bottom surface faces a cover element that covers the coupling device;

an optical waveguide configured to illuminate the coupling device and to indicate a state of charge of the charge storage device, wherein the optical waveguide is arranged on an interior surface of the charging pot, which interior surface includes the bottom surface of the charging pot, the arrangement of the optical waveguide being such that the bottom surface of the charging pot is illuminated by the optical waveguide;

a light source configured to couple light into the optical waveguide; and a facing element separate from the base body and configured to cover the optical waveguide, the facing element being transparent at a lateral side substantially perpendicular to the bottom surface and facing interior to the charging pot, the facing element also being opaque at an upper side facing outward from the charging pot, and wherein the optical waveguide has a first out-coupling structure arranged at a first position and the optical waveguide has a second out-coupling structure arranged at a second position, the first out-coupling structure having a grating that is spaced differently than a grating of the second out-coupling structure such that the optical waveguide emits less light at the first position than at the second position in order to ensure homogenous light emission towards the coupling device; and a control device for controlling the illumination of the charging device for charging the charge storage device, the control device comprising a controller programmed to:

detect whether the charging device is operating in a first state in which the cover element that covers the coupling device is open and the connector is not connected to the coupling device, or is operated in a second state in which the cover element is open and the connector is connected to the coupling device; and actuate the light source such that light to be coupled into the optical waveguide of the charging device changes depending on whether the charging device is operated in the first state or the second state.

18. The vehicle according to claim 17, wherein the controller of the control device is further programmed to:

deactivate the light source of the charging device after a defined time period after plugging the connector into the coupling device of the charging device; and activate the light source for coupling light into the optical waveguide when the vehicle is unlocked.

19. The vehicle according to claim 18, wherein the controller is further programmed to:

detect if the vehicle is in a ready-to-start state; and deactivate the light source of the charging device if the light source has been activated and the vehicle is in the ready-to-start state, or maintain the light source in a deactivated state if the light source is already in the deactivated state and the vehicle is in the ready-to-start state.

20. The vehicle according to claim 17, wherein the optical waveguide and the facing element are arranged in the charging device such that the light emitted from the optical waveguide is not visible at a viewing angle of 15 degrees or less when viewed from a rear end of the vehicle.

* * * * *